(12) United States Patent
Terazawa et al.

(10) Patent No.: US 10,036,079 B2
(45) Date of Patent: Jul. 31, 2018

(54) THICK STEEL SHEET HAVING EXCELLENT CTOD PROPERTIES IN MULTILAYER WELDED JOINTS, AND MANUFACTURING METHOD FOR THICK STEEL SHEET

(71) Applicant: JFE STEEL CORPORATION, Tokyo (JP)

(72) Inventors: Yusuke Terazawa, Tokyo (JP); Katsuyuki Ichimiya, Tokyo (JP); Kazukuni Hase, Tokyo (JP); Shigeru Endo, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 401 days.

(21) Appl. No.: 14/774,351

(22) PCT Filed: Mar. 5, 2014

(86) PCT No.: PCT/JP2014/001220
§ 371 (c)(1),
(2) Date: Sep. 10, 2015

(87) PCT Pub. No.: WO2014/141633
PCT Pub. Date: Sep. 18, 2014

(65) Prior Publication Data
US 2016/0017456 A1 Jan. 21, 2016

(30) Foreign Application Priority Data
Mar. 12, 2013 (JP) ................. 2013-048820

(51) Int. Cl.
| | |
|---|---|
| C22C 38/00 | (2006.01) |
| C21D 9/46 | (2006.01) |
| C21D 8/02 | (2006.01) |
| C22C 38/14 | (2006.01) |
| C22C 38/58 | (2006.01) |
| B23K 35/30 | (2006.01) |
| C22C 38/04 | (2006.01) |
| C22C 38/08 | (2006.01) |
| C21D 1/84 | (2006.01) |
| C21D 6/00 | (2006.01) |
| C22C 38/02 | (2006.01) |
| C22C 38/06 | (2006.01) |
| C22C 38/12 | (2006.01) |
| C22C 38/16 | (2006.01) |
| C22C 38/50 | (2006.01) |

(52) U.S. Cl.
CPC ............ *C21D 9/46* (2013.01); *B23K 35/3073* (2013.01); *C21D 1/84* (2013.01); *C21D 6/004* (2013.01); *C21D 6/005* (2013.01); *C21D 6/008* (2013.01); *C21D 8/02* (2013.01); *C21D 8/0205* (2013.01); *C21D 8/0226* (2013.01); *C21D 8/0247* (2013.01); *C21D 8/0263* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/50* (2013.01); *C22C 38/58* (2013.01); *C21D 2211/004* (2013.01)

(58) Field of Classification Search
CPC ......... C22C 38/50; C22C 38/14; C22C 38/04; C22C 38/08
See application file for complete search history.

(56) References Cited

U.S. PATENT DOCUMENTS

| | | | |
|---|---|---|---|
| 8,361,249 B2 * | 1/2013 | Shimoyama | ............. C21D 8/02 148/320 |
| 8,647,564 B2 * | 2/2014 | Ahn | ....................... C21D 6/005 148/320 |

(Continued)

FOREIGN PATENT DOCUMENTS

| | | |
|---|---|---|
| EP | 2666880 | 11/2013 |
| EP | 2813596 | 12/2014 |

(Continued)

OTHER PUBLICATIONS

International Search Report for International Application No. PCT/JP2014/001218 dated Jun. 10, 2014.
Entire patent prosecution history of U.S. Appl. No. 14/774,366, filed Sep. 10, 2015, entitled, "Thick Steel Sheet Having Excellent CTOD Properties in Multilayer Welded Joints, and Manufacturing Method for Thick Steel Sheet."

(Continued)

*Primary Examiner* — Scott R Kastler
(74) *Attorney, Agent, or Firm* — RatnerPrestia

(57) ABSTRACT

There is provided a thick steel plate having good multipass weld joint CTOD characteristics for low to medium heat input and a method for manufacturing the thick steel plate. A steel plate containing, on a mass percent basis, C: 0.03% to 0.12%, Si: 0.5% or less, Mn: 1.0% to 2.0%, P: 0.015% or less, S: 0.0005% to 0.0050%, Al: 0.005% to 0.060%, Ni: 0.5% to 2.0%, Ti: 0.005% to 0.030%, N: 0.0015% to 0.0065%, O: 0.0010% to 0.0050%, Ca: 0.0005% to 0.0060%, and optionally one or two or more of Cu and the like, wherein Ti/N, Ceq, Pcm, and ACR are in particular ranges, a base material of the plate has an effective grain size of 20 μm or less at half the thickness of the plate, and the plate contains a particular number of complex inclusions at ¼ and ½ of the thickness of the plate, the complex inclusions being composed of a sulfide containing Ca and Mn and an oxide containing Al and having an equivalent circular diameter of 0.1 μm or more. Steel having the composition described above is heated at a particular temperature, is then hot-rolled, and is cooled.

10 Claims, No Drawings

(56) References Cited

U.S. PATENT DOCUMENTS

| | | | |
|---|---|---|---|
| 2011/0041965 A1* | 2/2011 | Hoshino | C21D 8/02 148/645 |
| 2015/0075682 A1 | 3/2015 | Yuga | |
| 2016/0040274 A1* | 2/2016 | Terazawa | C22C 38/00 148/645 |

FOREIGN PATENT DOCUMENTS

| | | |
|---|---|---|
| JP | 60184663 | 9/1985 |
| JP | 61253344 | 11/1986 |
| JP | 0277521 | 3/1990 |
| JP | 0353367 | 8/1991 |
| JP | 05186823 | 7/1993 |
| JP | 05271766 | 10/1993 |
| JP | 07292414 | 11/1995 |
| JP | 1017982 | 1/1998 |
| JP | 11140582 | 5/1999 |
| JP | 2010202949 | 9/2010 |
| JP | 2012162797 | 8/2012 |
| JP | 2012184500 | 9/2012 |
| JP | 2013023713 | 2/2013 |
| JP | 2013095927 | 5/2013 |
| JP | 2013095928 | 5/2013 |
| WO | 2009072753 | 6/2009 |

OTHER PUBLICATIONS

Korean Office Action dated Jul. 19, 2016 for Korean Application No. 2015-7025141, including Concise Statement of Relevance, 16 pages.

Non Final Office Action for U.S. Appl. No. 14/774.366, dated Dec. 22, 2017, 40 pages.

Korean Final Rejection for Korean Application No. 10-2015-7027828, dated Mar. 31, 2017, with Concise Statement of Relevance of Office Action—4 Pages.

International Search Report for International Application No. PCT/JP2014/001220 dated Jun. 10, 2014.

Korean Office Action with partial English language translation for 1020157027828, dated Sep. 23, 2016, 8 pages.

\* cited by examiner

THICK STEEL SHEET HAVING EXCELLENT CTOD PROPERTIES IN MULTILAYER WELDED JOINTS, AND MANUFACTURING METHOD FOR THICK STEEL SHEET

CROSS REFERENCE TO RELATED APPLICATIONS

This is the U.S. National Phase application of PCT International Application No. PCT/JP2014/001220, filed Mar. 5, 2014, and claims priority to Japanese Patent Application No. 2013-048820, filed Mar. 12, 2013, the disclosures of each of these applications being incorporated herein by reference in their entireties for all purposes.

FIELD OF THE INVENTION

The present invention relates to steel for use in ships, offshore structures, line pipes, and pressure vessels, to a thick steel sheet or plate that includes a base material having high low-temperature toughness and has good multipass weld joint CTOD characteristics for low to medium heat input, and to a method for manufacturing the thick steel plate.

BACKGROUND OF THE INVENTION

The toughness of steel is evaluated using mainly the Charpy test. In recent years, a crack tip opening displacement test (hereinafter referred to as a CTOD test) has often been used as a method for evaluating fracture resistance with high precision for thick steel plates for use in structures. In this test, initiation resistance to brittle fracture is measured by subjecting a test specimen having a fatigue precrack in a toughness evaluation portion to a low-temperature bending test and measuring the crack tip opening displacement (plastic strain) immediately before fracture.

Welding used for applying thick steel plates to structures is multipass welding. It is known that a multipass weld heat affected zone (hereinafter referred to as a multipass weld HAZ) includes a very low toughness zone (hereinafter referred to as ICCGHAZ: Inter Critically Coarse Grain Heat Affected Zone). The ICCGHAZ includes an island martensite (MA: Martensite-Austenite Constituent) microstructure in a coarse matrix microstructure, formed by reheating a zone having a coarse microstructure (CGHAZ: Coarse Grain Heat Affected Zone) in the vicinity of a weld line formed by a previous weld pass to a ferrite+austenite two-phase region in the weld pass of the next layer.

A steel plate is basically tested over the entire thickness in a joint CTOD test. Thus, in the joint CTOD test of a multipass weld HAZ, an evaluation zone into which a fatigue precrack is introduced includes an ICCGHAZ microstructure. The joint CTOD characteristics determined in the joint CTOD test are controlled by the toughness of the most brittle zone of the evaluated zone although the most brittle zone is very small. Thus, the joint CTOD characteristics of a multipass weld HAZ reflect not only CGHAZ microstructure toughness but also ICCGHAZ microstructure toughness. Thus, the improvement of the joint CTOD characteristics of a multipass weld HAZ requires the improvement of ICCGHAZ microstructure toughness.

Known techniques for improving heat affected zone (hereinafter also referred to as HAZ) toughness include suppression of austenite grain coarsening of CGHAZ using finely-dispersed TiN and the use of TiN ferrite transformation nuclei.

Other known techniques include suppression of austenite grain growth due to dispersion of REM oxysulfide formed by the addition of REM, suppression of austenite grain growth due to dispersion of Ca oxysulfide formed by the addition of Ca, and a technique using the ferrite nucleation ability of BN and oxide dispersion in combination.

For example, a technique for suppressing coarsening of an austenite microstructure in HAZ using REM and TiN particles is proposed in Patent Literatures 1 and 2. A technique for improving HAZ toughness using CaS and a technique for improving base material toughness by hot rolling are proposed in Patent Literature 3.

As a measure to prevent a decrease in ICCGHAZ toughness, a technique for increasing base material strength by decreasing the C and Si contents to suppress the formation of MA and by adding Cu is proposed (for example, Patent Literature 4). A technique for improving HAZ toughness by using BN as ferrite transformation nuclei in a high heat input heat affected zone to make a HAZ microstructure finer is proposed in Patent Literature 5.

Patent Literature

PTL 1: Japanese Examined Patent Application Publication No. 03-053367
PTL 2: Japanese Unexamined Patent Application Publication No. 60-184663
PTL 3: Japanese Unexamined Patent Application Publication No. 2012-184500
PTL 4: Japanese Unexamined Patent Application Publication No. 05-186823
PTL 5: Japanese Unexamined Patent Application Publication No. 61-253344

SUMMARY OF INVENTION

The CTOD temperature specified in a standard that defines joint CTOD characteristics (for example, API standard RP-2Z) is generally −10° C. In order to develop new resources to meet increasing energy demands in recent years, construction sites of offshore structures have been shifting to cold regions where resource mining has not be carried out. Thus, there is a growing demand for steel that can be used at a CTOD specified temperature lower than the CTOD temperature specified in the API standard (hereinafter also referred to as a special low temperature CTOD specification). The present inventors found as a result of studies that these techniques could not fully satisfy joint CTOD characteristic requirements for multipass weld joints that meet recent required low temperature specifications. For example, with respect to the technique for suppressing coarsening of an austenite microstructure in HAZ using REM and TiN particles described in Patent Literatures 1 and 2, TiN melts in a bonded portion that can reach a high temperature when welded and has no significant effect on the suppression of austenite grain growth.

REM oxysulfide and Ca oxysulfide are effective in suppressing austenite grain growth. However, the effect of improving toughness by suppression of austenite grain coarsening in HAZ cannot fully satisfy joint CTOD characteristic requirements at the specified low temperature. The ferrite nucleation ability of BN is effective for HAZ having a structure consisting essentially of ferrite due to a low cooling rate of the heat affected zone in high heat input welding. In the case of thick steel plated, however, the ferrite nucleation ability of BN is not effective because the HAZ microstructure consists essentially of bainite due to a relatively high alloy content of the base material on one hand and relatively low heat input of multipass welding on the other hand.

In Patent Literature 3, joint CTOD characteristic requirements at the normal specified temperature (−10° C.) are satisfied. However, joint CTOD characteristics at the specified low temperature are not described.

Joint CTOD characteristics at the specified low temperature are also not described in Patent Literature 4. It is assumed that only an improvement in ICCGHAZ toughness due to a decrease in the base material composition cannot fully meet the special low temperature CTOD specification. A decrease in the alloying element content of the base material composition to improve ICCGHAZ toughness may impair the characteristics of the base material and is therefore rarely applied to thick steel plates for use in offshore structures.

The technique described in Patent Literature 5 is effective for HAZ having a structure consisting essentially of ferrite due to a low cooling rate of the heat affected zone as in high heat input welding. In the case of thick steel plates, however, the technique is not effective because the HAZ microstructure consists essentially of bainite due to a relatively high alloy content of the base material and relatively low heat input of multipass welding.

Thus, a technique for improving CGHAZ and ICCGHAZ toughness in a multipass weld heat affected zone of thick steel plates has not been established. Thus, it is difficult to improve joint CTOD characteristics when a notch is located in a bonded portion including CGHAZ and ICCGHAZ.

It is an object of the present invention to provide a thick steel plate having good multipass weld joint CTOD characteristics and a method for manufacturing the thick steel plate.

In order to solve the problems described above, the present inventors paid attention to Ca complex inclusions and extensively studied the effect of suppressing austenite grain coarsening, the bainite, acicular ferrite, and ferrite nucleation effects in a multipass weld HAZ, and the improvement of multipass weld HAZ toughness. The present inventors obtained the following findings.

(1) When the Ca, O, and S contents of steel are controlled such that the atomic concentration ratio (ACR) represented by the following formula ranges from 0.2 to 1.4, complex inclusions of Ca sulfide containing Mn dissolved therein and Al oxide are formed.

$$ACR=(Ca-(0.18+130*Ca)*O)/(1.25*S)$$

(2) When the inclusions have the form of complex inclusions composed of a sulfide containing Ca and Mn and an oxide containing Al, the inclusions can be stable in a high-temperature zone in the vicinity of a weld line and properly exert an austenite grain coarsening effect. Furthermore, a Mn-poor layer having bainite and acicular ferrite nucleation effects is formed around the complex inclusions.

(3) The nucleation site during cooling of HAZ is mainly an austenite grain boundary. In an aspect of the present invention, the complex inclusions having the nucleation effect in austenite grains induce nucleation in the austenite grains as well as austenite grain boundaries, decrease the grain size of the finally formed HAZ microstructure, and improve HAZ toughness and joint CTOD characteristics.

(4) Excessively small complex inclusions have insufficient bainite, acicular ferrite, and ferrite nucleation effects. Thus, the complex inclusions should have an equivalent circular diameter of 0.1 μm or more.

(5) In order to make the most of the transformation nucleation effect of the complex inclusions, each austenite grain in HAZ must contain at least one inclusion during welding heating. Since the austenite grain size in the vicinity of a weld line is approximately 200 μm for a heat input of approximately 5 kJ/mm, the density of inclusions should be 25/mm$^2$ or more.

(6) The complex inclusions themselves have low toughness. Thus, an excessive number of inclusions reduce HAZ toughness. In particular, when a slab is manufactured by continuous casting, because of the difference in density between inclusions and steel, unsolidified portions float in the slab, and inclusions tend to accumulate at a ¼t (t: thickness) position. Thus, the number of inclusions should not be excessive. The number of inclusions should be appropriately controlled also at half the thickness of the plate at which segregation of elements decreases the multipass weld HAZ toughness. The multipass weld joint CTOD characteristics can be good when the number of inclusions is 250/mm$^2$ or less.

(7) In general, alloying elements are concentrated in the element segregation zone at half the thickness of the slab. This causes the problem that coarse inclusions are sparsely dispersed. However, large rolling reduction per pass, for example, a cumulative rolling reduction of 33% or more with a rolling reduction/pass being 5% or more at a half-thickness temperature of 950° C. or more can increase strain at half the thickness of the plate and elongate and cut coarse inclusions to densely disperse fine inclusions. This allows the inclusions to have the HAZ toughness improving effect and realizes good CTOD characteristics that can meet the special CTOD specification.

The matrix microstructure toughness of a multipass weld HAZ can be improved by satisfying 1.5≤Ti/N≤5.0 so as to finely disperse TiN, which is effective in suppressing austenite grain growth, in steel, by satisfying carbon equivalent Ceq=[C]+[Mn]/6+([Cu]+[Ni])/15+([Cr]+[Mo]+[V])/5<0.45, and by satisfying welding crack susceptibility index Pcm=[C]+[Si]/30+([Mn]+[Cu]+[Cr])/20+[Ni]/60+[Mo]/15+[V]/10+5[B]<0.20, as well as by making the multipass weld HAZ finer by inclusion morphology control.

The present inventors also studied an SC/ICHAZ (sub-critically reheated HAZ/intercritically reheated HAZ) boundary, which is a transformed zone/untransformed zone boundary of a base material in welding, required by BS standard EN10225 (2009) or API standard Recommended Practice 2Z (2005), which defines a joint CTOD test method. The present inventors found that the joint CTOD characteristics at the SC/ICHAZ boundary are controlled by base material toughness, and in order to satisfy joint CTOD characteristic requirements at a test temperature of −20° C. at the SC/ICHAZ boundary, base material toughness must be improved by decreasing the crystal grain size such that the effective grain size of the base material microstructure is 20 μm or less. The phrase "good multipass weld joint CTOD characteristics", as used herein, means that the crack tip opening displacement at the notch positions CGHAZ (bond) and SC/ICHAZ is 0.35 mm or more at a test temperature of −20° C.

On the basis of these findings, the present invention has been completed after further studies. The present invention includes:

1. A thick steel plate having good multipass weld joint CTOD characteristics, containing, on a mass percent basis: C: 0.03% to 0.12%, Si: 0.5% or less, Mn: 1.0% to 2.0%, P: 0.015% or less, S: 0.0005% to 0.0050%, Al:

0.005% to 0.060%, Ni: 0.5% to 2.0%, Ti: 0.005% to 0.030%, N: 0.0015% to 0.0065%, O: 0.0010% to 0.0050%, and Ca: 0.0005% to 0.0060% so as to satisfy the formulae (1) to (4), the remainder being Fe and incidental impurities, a base material of the plate has an effective grain size of 20 μm or less at half the thickness of the plate, and the plate contains 25 to 250/mm² of complex inclusions at ¼ and ½ of the thickness (t: mm) of the plate, the complex inclusions being composed of a sulfide containing Ca and Mn and an oxide containing Al and having an equivalent circular diameter of 0.1 μm or more:

$$1.5 \leq Ti/N \leq 5.0 \tag{1},$$

$$0.43 \leq Ceq\ (=[C]+[Mn]/6+([Cu]+[Ni])/15+([Cr]+[Mo]+[V])/5) \leq 0.50 \tag{2},$$

$$0.18 \leq Pcm\ (=[C]+[Si]/30+([Mn]+[Cu]+[Cr])/20+[Ni]/60+[Mo]/15+[V]/10+5[B]) \leq 0.22 \tag{3, and}$$

$$0.2 < (Ca-(0.18+130*Ca)*O)/(1.25*S) < 1.4 \tag{4},$$

wherein alloying elements in the formulae (1) to (4) denote the corresponding contents (mass %).

2. The thick steel plate having good multipass weld joint CTOD characteristics according to 1, further containing, on a mass percent basis, one or two or more of Cu: 0.05% to 2.0%, Cr: 0.05% to 0.30%, Mo: 0.05% to 0.30%, Nb: 0.005% to 0.035%, V: 0.01% to 0.10%, W: 0.01% to 0.50%, B: 0.0005% to 0.0020%, REM: 0.0020% to 0.0200%, and Mg: 0.0002% to 0.0060%.

3. A method for manufacturing the thick steel plate having good multipass weld joint CTOD characteristics according to 1 or 2, including: heating a slab having the composition according to 1 or 2 to a temperature of 950° C. or more and 1200° C. or less, hot rolling the slab at a cumulative rolling reduction of 30% or more with a rolling reduction/pass being 8% or more at a half-thickness temperature of 950° C. or more and at a cumulative rolling reduction of 40% or more at a half-thickness temperature of less than 950° C., and cooling the hot-rolled plate to 600° C. or less with an average cooling rate between 700° C. and 500° C. at half the thickness of the plate being in the range of 3° C. to 50° C./s.

4. A method for manufacturing the thick steel plate having good multipass weld joint CTOD characteristics according to 1 or 2, including: heating a slab having the composition according to 1 or 2 to a temperature of 950° C. or more and 1200° C. or less, hot rolling the slab at a cumulative rolling reduction of 33% or more with a rolling reduction/pass being 5% or more at a half-thickness temperature of 950° C. or more and at a cumulative rolling reduction of 40% or more at a half-thickness temperature of less than 950° C., and cooling the hot-rolled plate to 600° C. or less with an average cooling rate between 700° C. and 500° C. at half the thickness of the plate being in the range of 3° C. to 50° C./s. 5. The method for manufacturing the thick steel plate having good multipass weld joint CTOD characteristics according to 3 or 4, further including performing tempering treatment at a temperature of 700° C. or less after the cooling.

The present invention can provide a thick steel plate having good multipass weld joint CTOD characteristics and a method for manufacturing the thick steel plate and is industrially very useful.

DETAILED DESCRIPTION OF EMBODIMENTS OF THE INVENTION

The reasons for limiting the constituent features of embodiments of the present invention will be described below.

1. Chemical Components

First, the reason for defining the chemical components of steel according to embodiments of the present invention will be described below. The percentages are on a mass basis.

C: 0.03% to 0.12%

C is an element that can improve the strength of steel. The C content should be 0.03% or more. However, an excessively high C content of more than 0.12% results in poor joint CTOD characteristics. Thus, the C content ranges from 0.03% to 0.12%, preferably 0.04% to 0.08%.

Si: 0.5% or less

An excessively high Si content of more than 0.5% results in poor joint CTOD characteristics. Thus, the Si content is 0.5% or less, preferably 0.4% or less, more preferably more than 0.1% and 0.3% or less.

Mn: 1.0% to 2.0%

Mn is an element that can improve the quenching hardenability of steel and thereby improve the strength of the steel. However, an excessive addition of Mn significantly impairs joint CTOD characteristics. Thus, the Mn content ranges from 1.0% to 2.0%, preferably 1.2% to 1.8%.

P: 0.015% or less

P is an element that is inevitably contained in steel as an impurity and decreases the toughness of steel. Thus, it is desirable to minimize P. In particular, a P content of more than 0.015% results in very poor joint CTOD characteristics. Thus, the P content is limited to 0.015% or less, preferably 0.010% or less.

S: 0.0005% to 0.0050%

S is an element necessary for inclusions to improve multipass weld HAZ toughness. The S content should be 0.0005% or more. However, a S content of more than 0.0050% results in poor joint CTOD characteristics. Thus, the S content is limited to 0.0050% or less, preferably 0.0045% or less.

Al: 0.005% to 0.060%

Al is an element necessary for inclusions to improve multipass weld HAZ toughness. The Al content should be 0.005% or more. An Al content of more than 0.060% results in poor joint CTOD characteristics. Thus, the Al content is limited to 0.060% or less.

Ni: 0.5% to 2.0%

Ni is an element that can reinforce a base material and a joint without significantly reducing the toughness of the base material and the joint. This effect requires a Ni content of 0.5% or more. However, the reinforcement is saturated at a Ni content of 2.0%, and a Ni content of more than 2.0% incurs increased costs. Thus, the Ni content is limited to 2.0% or less, preferably 0.5% to 1.8%.

Ti: 0.005% to 0.030%

Ti is an element that can be precipitated as TiN and is effective in suppressing austenite grain coarsening in HAZ, making a HAZ microstructure finer, and improving the toughness of steel. These effects require a Ti content of 0.005% or more. An excessively high Ti content of more than 0.030% results in low heat affected zone toughness due to dissolved Ti or precipitation of coarse TiC. Thus, Ti is limited to the range of 0.005% to 0.030%, preferably 0.005% to 0.025%.

N: 0.0015% to 0.0065%

N is an element that can be precipitated as TiN and thereby suppress austenite grain coarsening in HAZ, make a HAZ microstructure finer, and effectively improve the toughness of steel. These effects require a N content of 0.0015% or more. An excessively high N content of more than 0.0065% results in low heat affected zone toughness.

Thus, the N content is limited to the range of 0.0015% to 0.0065%, preferably 0.0015% to 0.0055%.

O: 0.0010% to 0.0050%

O is an element necessary for inclusions to improve multipass weld HAZ toughness. The O content should be 0.0010% or more. An O content of more than 0.0050% results in poor joint CTOD characteristics. Thus, the O content is limited to the range of 0.0010% to 0.0050%, preferably 0.0010% to 0.0045%.

Ca: 0.0005% to 0.0060%

Ca is an element necessary for inclusions to improve multipass weld HAZ toughness. The Ca content should be 0.0005% or more. A Ca content of more than 0.0060% results in poor joint CTOD characteristics. Thus, the Ca content is limited to the range of 0.0005% to 0.0060%, preferably 0.0007% to 0.0050%.

$$1.5 \leq Ti/N \leq 5.0 \quad (1)$$

The amount of dissolved N in HAZ and the precipitation state of TiC depend on Ti/N. Ti/N of less than 1.5 results in low HAZ toughness due to dissolved N not fixed as TiN. Ti/N of more than 5.0 results in low HAZ toughness due to precipitation of coarse TiC. Thus, Ti/N is limited to 1.5 or more and 5.0 or less, preferably 1.8 or more and 4.5 or less. The alloying elements in the formula (1) denote the corresponding contents (mass %).

Ceq: 0.43% or more and 0.50% or less

Strength decreases with decreasing Ceq. Ceq of less than 0.43% results in unsatisfactory strength characteristics.

An increase in Ceq results in low HAZ toughness due to an increased amount of low-toughness microstructure, such as island martensite or bainite, in a HAZ microstructure. Ceq of more than 0.50% results in low HAZ matrix microstructure toughness and unsatisfactory joint CTOD characteristics even using a technique for improving HAZ toughness with inclusions. Thus, Ceq ranges from 0.43% to 0.50%, preferably more than 0.45% and 0.49% or less. Ceq is preferably more than 0.45 in order to consistently achieve the desired strength of a base material and a joint. Ceq is preferably 0.49 or less in order for consistent HAZ toughness. Furthermore, Ceq=[C]+[Mn]/6+([Cu]+[Ni])/15+ ([Cr]+[Mo]+[V])/5 (2), wherein the alloying elements denote the corresponding contents (mass %).

Pcm: 0.18 or more and 0.22% or less

Strength decreases with decreasing Pcm. Pcm of less than 0.18% results in unsatisfactory strength characteristics. An increase in Pcm results in low HAZ toughness due to an increased amount of low-toughness microstructure, such as island martensite or bainite, in a HAZ microstructure. Pcm of more than 0.22% results in low HAZ matrix microstructure toughness and unsatisfactory joint CTOD characteristics even using a technique for improving HAZ toughness with inclusions. Thus, Pcm ranges from 0.18% to 0.22%, preferably 0.19% to 0.21%. Furthermore, Pcm=[C]+[Si]/30+([Mn]+[Cu]+[Cr])/20+[Ni]/60+[Mo]/15+[V]/10+5[B] (3), wherein the alloying elements denote the corresponding contents (mass %).

$$0.2 \leq (Ca-(0.18+130*Ca)*O)/(1.25*S) \leq 1.4$$

The atomic concentration ratio (ACR) of Ca, O, and S in steel is represented by (Ca−(0.18+130*Ca)*O)/(1.25*S). An ACR of less than 0.2 indicates that sulfide inclusions are mainly MnS. MnS has a low melting point and melts in the vicinity of a weld line during welding. Thus, MnS does not have the effect of suppressing austenite grain coarsening in the vicinity of a weld line and the transformation nucleus effect during cooling after welding. On the other hand, (Ca−(0.18+130*Ca)*O)/(1.25*S) of more than 1.4 indicates that sulfide inclusions are mainly CaS. Because a Mn-poor layer, which is required for transformation nucleation, is not formed around CaS, no transformation nucleus effect is produced. Thus, (Ca−(0.18+130*Ca)*O)/(1.25*S) is 0.2 or more and 1.4 or less, preferably 0.3 or more and 1.2 or less. The alloying elements in the formula (4) denote the corresponding contents (mass %).

A thick steel plate according to embodiments of the present invention is composed essentially of the components described above, and the remainder is Fe and incidental impurities. In order to improve strength, toughness control, and joint toughness, a thick steel plate according to the present invention can further contain one or two or more of Cu: 0.05% to 2.0%, Cr: 0.05% to 0.30%, Mo: 0.05% to 0.30%, Nb: 0.005% to 0.035%, V: 0.01% to 0.10%, W: 0.01% to 0.50%, B: 0.0005% to 0.0020%, REM: 0.0020% to 0.0200%, and Mg: 0.0002% to 0.0060%.

Cu: 0.05% to 2.0%

Cu is an element that can reinforce a base material and a joint without significantly reducing the toughness of the base material and the joint. This effect requires a Cu content of 0.05% or more. However, an addition of 2.0% or more may cause steel plate cracking resulting from a Cu-rich layer formed directly under scales. Thus, when Cu is added, the Cu content ranges from 0.05% to 2.0%, preferably 0.1% to 1.5%.

Cr: 0.05% to 0.30%

Cr is an element that can improve the strength of steel by improving quenching hardenability. An excessive addition of Cr results in poor joint CTOD characteristics. Thus, when Cr is added, the Cr content ranges from 0.05% to 0.30%.

Mo: 0.05% to 0.30%

Mo is an element that can improve the strength of steel by improving quenching hardenability. However, an excessive addition of Mo results in poor joint CTOD characteristics. Thus, when Mo is added, the Mo content ranges from 0.05% to 0.30%.

Nb: 0.005% to 0.035%

Nb is an element that can extend the non-recrystallization temperature range of an austenite phase and is effective for efficient rolling in a non-recrystallization region and the formation of microstructures. These effects require a Nb content of 0.005% or more. However, a Nb content of more than 0.035% results in poor joint CTOD characteristics. Thus, when Nb is added, the Nb content ranges from 0.005% to 0.035%.

V: 0.01% to 0.10%

V is an element that can improve the strength of a base material. A V content of 0.01% or more is effective. However, a V content of more than 0.10% results in low HAZ toughness. Thus, when V is added, the V content ranges from 0.01% to 0.10%, preferably 0.02% to 0.05%.

W: 0.01% to 0.50%

W is an element that can improve the strength of a base material. A W content of 0.01% or more is effective. However, a W content of more than 0.50% results in low HAZ toughness. Thus, when W is added, the W content ranges from 0.01% to 0.50%, preferably 0.05% to 0.35%.

B: 0.0005% to 0.0020%

B is an element that is effective in improving quenching hardenability at a very low B content and thereby improving the strength of a steel plate. These effects require a B content of 0.0005% or more. However, a B content of more than 0.0020% results in low HAZ toughness. Thus, when B is added, the B content ranges from 0.0005% to 0.0020%.

REM: 0.0020% to 0.0200%

REM can form oxysulfide inclusions and thereby suppress austenite grain growth in HAZ and improve HAZ toughness. These effects require a REM content of 0.0020% or more. However, an excessively high REM content of more than 0.0200% results in low, base material and HAZ toughness. Thus, when REM is added, the REM content ranges from 0.0020% to 0.0200%.

Mg: 0.0002% to 0.0060%

Mg is an element that can form oxide inclusions and is thereby effective in suppressing austenite grain growth in a heat affected zone and improving heat affected zone toughness. These effects require a Mg content of 0.0002% or more. However, these effects are saturated at a Mg content of 0.0060%, and a Mg content of more than 0.0060% is not worth the content and is economically disadvantageous. Thus, when Mg is added, the Mg content ranges from 0.0002% to 0.0060%.

2. Microstructure of Base Material

In order to improve the joint CTOD characteristics at an SC/ICHAZ boundary, the effective grain size of a base material microstructure at half the thickness of a plate is 20 µm or less such that the toughness of the base material is improved by decreasing the crystal grain size at half the thickness of the plate where center segregation is likely to occur. The base material microstructure phase is not particularly limited, provided that desired strength is achieved. The term "effective grain size", as used herein, refers to the equivalent circular diameter of a crystal grain surrounded by a high-angle grain boundary having an orientation difference of 15 degrees or more with respect to adjacent crystal grains.

3. Inclusions

Complex inclusions composed of a sulfide containing Ca and Mn and an oxide containing Al: 25 to 250/mm$^2$ at an equivalent circular diameter of 0.1 µm or more A Mn-poor region around inclusions formed by formation of a sulfide containing Mn is effective for transformation nucleation. The sulfide further containing Ca has an increased melting point, is resistant to a temperature rise in the vicinity of a weld line in HAZ, and has the effect of suppressing austenite grain growth and the transformation nucleus effect. In order to produce these effects, the complex inclusions have an equivalent circular diameter of 0.1 µm or more, and the number of complex inclusions ranges from 25 to 250/mm$^2$, preferably 35 to 170/mm$^2$, at ¼ and ½ of the thickness of the plate.

4. Manufacturing Method

The reasons for limiting the conditions of the manufacturing method will be described below. Unless otherwise specified, the temperatures are steel surface temperatures.

Slab Heating Conditions

A slab is made of continuous cast steel and is heated to a temperature of 950° C. or more and 1200° C. or less. A heating temperature of less than 950° C. results in a residual untransformed zone after heating and a residual coarse microstructure after solidification. Thus, a desired fine grain microstructure cannot be formed. On the other hand, a heating temperature of more than 1200° C. results in austenite grain coarsening, and a desired fine grain microstructure cannot be formed by controlled rolling. Thus, the heating temperature is limited to 950° C. or more and 1200° C. or less, preferably 970° C. or more and 1170° C. or less.

Hot Rolling Conditions

In hot rolling, the pass conditions in a recrystallization temperature range and the pass conditions in a non-recrystallization temperature range are defined. In the recrystallization temperature range, the cumulative rolling reduction is 30% or more for rolling reduction with a rolling reduction/pass of 8% or more at a half-thickness temperature of 950° C. or more. Alternatively, in the recrystallization temperature range, the cumulative rolling reduction is 33% or more for rolling reduction with a rolling reduction/pass of 5% or more at a half-thickness temperature of 950° C. or more.

Rolling at less than 950° C. rarely causes recrystallization, and the austenite grain size is insufficiently decreased. Thus, the temperature is limited to 950° C. or more.

In rolling reduction with a rolling reduction/pass of less than 8%, a decrease in grain size due to recrystallization does not occur. Even for rolling reduction with a rolling reduction/pass of 8% or more, a decrease in crystal grain size due to recrystallization is insufficient at a cumulative rolling reduction less than 30%. Thus, for rolling reduction with a rolling reduction/pass of 8% or more, the cumulative rolling reduction is 30% or more. As a result of further studies, the present inventors found that even for rolling reduction with a rolling reduction/pass of 5% or more, a cumulative rolling reduction of 33% or more results in a sufficient decrease in crystal grain size due to recrystallization. Thus, for rolling reduction with a rolling reduction/pass of 5% or more, the cumulative rolling reduction is 33% or more.

Cumulative Rolling Reduction of 40% or More at Half-Thickness Temperature of Less than 950° C. in Non-Recrystallization Temperature Range In the rolling of steel according to embodiments of the present invention at less than 950° C., recrystallization rarely occurs, and strain in the steel is not relieved by recrystallization and is accumulated, acts as transformation nuclei in subsequent cooling, and thereby makes a final microstructure finer. A cumulative rolling reduction of less than 40% results in an insufficient effect of decreasing the crystal grain size. Thus, the cumulative rolling reduction is 40% or more at a half-thickness temperature of less than 950° C.

Cooling Conditions

Cooling after hot rolling is performed such that the average cooling rate between 700° C. and 500° C. at half the thickness of the plate ranges from 3° C. to 50° C./s. The cooling stop temperature is 600° C. or less.

An average cooling rate of less than 3° C./s at half the thickness of the plate results in the formation of a coarse ferrite phase in a base material microstructure and poor CTOD characteristics at SC/ICHAZ. An average cooling rate of more than 50° C./s results in poor CTOD characteristics at SC/ICHAZ due to increased base material strength. Thus, the average cooling rate between 700° C. and 500° C. at half the thickness of the plate is limited to the range of 3° C. to 50° C./s. When the cooling stop temperature is more than 600° C., transformation strengthening due to cooling is insufficient, and the base material strength is insufficient. Thus, the cooling stop'temperature is 600° C. or less.

In order to decrease base material strength and improve toughness, tempering can be performed at 700° C. or less after cooling. A tempering temperature of more than 700° C. results in the formation of a coarse ferrite phase and low toughness of SCHAZ. Thus the tempering temperature is limited to 700° C. or less, preferably 650° C. or less.

EXAMPLES

Table 1 lists the composition of steel specimens. A slab was continuously casted with a continuous casting machine having a vertical length of 17 m at a casting speed in the range of 0.2 to 0.4 m/min and at a water flow rate in the range of 1000 to 2000 l/min/m² in a cooling zone. Steel specimens A to K according to examples have compositions within the scope of the present invention. Steel specimens L to T according to comparative examples have compositions outside the preferred scope of the present invention. These steel specimens were used to manufacture thick steel plates under conditions listed in Table 2. A multipass weld joint was formed from each thick steel plate. The half-thickness temperature was measured during hot rolling with a thermocouple disposed at the center of the plate in the longitudinal, width, and thickness directions.

The base material strength and the distribution of inclusions in the thickness direction were examined in each thick steel plate. The average effective grain size was measured by taking a sample from the center of a plate in the longitudinal, width, and thickness directions, subjecting the sample to mirror polish finishing, performing an EBSP analysis under the following conditions, and from the resulting crystal orientation map determining, as the effective grain size, the equivalent circular diameter of a microstructure surrounded by a high-angle grain boundary having an orientation difference of 15 degrees or more with respect to adjacent crystal grains.

EBSP Conditions

Analysis area: 1 mm*1 mm area at half the thickness of the plate

Step size: 0.4 μm

The density of inclusions was measured by taking samples from a plate at ¼ and ½ of the thickness of the plate in the longitudinal, width, and thickness directions, subjecting the samples to mirror polish finishing with a diamond buff and an alcohol, identifying inclusions in a 1 mm*1 mm evaluation area by an EDX analysis with a field-emission scanning electron microscope (FE-SEM), and measuring the density of the inclusions. In the evaluation of the type of inclusions, an element was considered to be an inclusion when the atomic percentage of the element was 3% or more of the chemical composition of inclusions quantified by a ZAF method.

In a tensile test, a round bar tensile test piece having a diameter 14 mm and a length of 70 mm was taken from a plate in the plate width direction at ¼ of the thickness (t) of the plate, and the tensile test was performed according to EN10002-1. The yield strength in Table 2 refers to upper yield stress in the presence of an upper yield point and refers to 0.2% proof stress in the absence of an upper yield point.

A weld joint used in a joint CTOD test was formed by submerged arc welding (multipass welding) with a K groove shape and a heat input of 5.0 kJ/mm. The test method conformed to BS standard EN10225 (2009). A test specimen had a t (thickness)*t (thickness) cross-section. The CTOD value (δ) was determined at a test temperature of −20° C. For each type of steel, three test pieces for each notch position were tested. Test pieces having an average CTOD value of 0.35 mm or more were judged to be a steel plate having good joint CTOD characteristics.

The notch positions were CGHAZ on the straight line of K groove and an SC/ICHAZ boundary. After the test, a tip of a fatigue precrack on a test specimen fracture surface was observed in CGHAZ and the SC/ICHAZ boundary defined by EN10225 (2009). In a multipass weld joint CTOD test, a notch position in CGHAZ includes a certain area of ICCGHAZ, and the test results reflect both CGHAZ toughness and ICCGHAZ toughness.

Table 2 shows the test results. Nos. 1 to 11 according to examples, which have chemical components, an effective grain size of a base material, an inclusion density, and manufacturing conditions within the scope of the present invention, have high base material tensile strength and good joint CTOD characteristics in joint CGHAZ and SC/ICHAZ boundary.

Nos. 12 to 27 according to comparative examples have poor joint CTOD characteristics in CGHAZ and/or the SC/ICHAZ boundary.

No. 12 has a high C content and a HAZ microstructure of a low-toughness hard microstructure. Thus, No. 12 has a low joint CTOD value in CGHAZ.

No. 13 has low Ti/N, a decrease in the amount of TiN required to suppress coarsening of a HAZ microstructure, and a high dissolved N content, which adversely affects HAZ toughness. Thus, No. 13 has a low joint CTOD value in CGHAZ.

No. 14 has a high ACR, contains sulfide inclusions consisting essentially of CaS, and a decrease in the number of Ca complex inclusions, which are required to make a HAZ microstructure finer. Thus, No. 14 has a low joint CTOD value in CGHAZ.

No. 15 has high Ti/N and low HAZ toughness due to precipitation of coarse TiC and the presence of dissolved Ti. Thus, No. 15 has a low joint CTOD value in CGHAZ and the SC/ICHAZ boundary.

No. 16 has a low Ca content and a decrease in the number of Ca complex inclusions required to make a HAZ microstructure finer. Thus, No. 16 has a low joint CTOD value in CGHAZ.

No. 17 has a high Ceq and a HAZ microstructure of a low-toughness hard microstructure. Thus, No. 17 has a low joint CTOD value in CGHAZ.

No. 18 has a high Pcm and a HAZ microstructure of a low-toughness hard microstructure. Thus, No. 18 has a low joint CTOD value in CGHAZ.

No. 19 has a low Ti content and a decrease in the amount of TiN required to suppress coarsening of a HAZ microstructure. Thus, No. 19 has a low joint CTOD value in CGHAZ.

No. 20 has a low ACR, contains sulfide inclusions consisting essentially of MnS, and a decrease in the number of Ca complex inclusions, which are required to make a HAZ microstructure finer. Thus, No. 20 has a low joint CTOD value in CGHAZ.

No. 21 has a high Ca content and an increase in the number of inclusions. Thus, No. 21 has a low joint CTOD value in CGHAZ and the SC/ICHAZ boundary.

No. 22 has a base material having a large effective grain size due to a low cooling rate and formation of coarse ferrite. Thus, No. 22 has a low joint CTOD value at the SC/ICHAZ boundary.

No. 23 has a base material having a large effective grain size due to a high tempering temperature and formation of coarse ferrite. Thus, No. 23 has a low joint CTOD value at the SC/ICHAZ boundary.

No. 24 has a base material having a large effective grain size due to a low heating temperature and a residual casting microstructure. Thus, No. 24 has a low joint CTOD value at the SC/ICHAZ boundary.

No. 25 has a base material having a large effective grain size due to a low rolling reduction in a non-recrystallization region. Thus, No. 25 has a low joint CTOD value at the SC/ICHAZ boundary.

NQ. 26 has a base material having a large effective grain size due to a high heating temperature and grain growth during the high-temperature heating. Thus, No. 26 has a low joint CTOD value at the SC/ICHAZ boundary.

No. 27 has a base material having a large effective grain size due to a low rolling reduction in a recrystallization region. Thus, No. 27 has a low joint CTOD value at the SC/ICHAZ boundary.

TABLE 1

(mass %)

| Steel type | C | Si | Mn | P | S | Al | Ni | Ti | N | O | Ca | Cu | Cr | Mo |
|---|---|---|---|---|---|---|---|---|---|---|---|---|---|---|
| A | 0.05 | 0.3 | 2.0 | 0.004 | 0.0013 | 0.022 | 1.7 | 0.010 | 0.0043 | 0.0024 | 0.0016 | | | |
| B | 0.11 | 0.2 | 1.6 | 0.005 | 0.0048 | 0.029 | 1.5 | 0.008 | 0.0033 | 0.0039 | 0.0039 | | | |
| C | 0.12 | 0.1 | 1.2 | 0.008 | 0.0007 | 0.018 | 2.0 | 0.016 | 0.0034 | 0.0038 | 0.0037 | | | |
| D | 0.08 | 0.2 | 1.6 | 0.005 | 0.0019 | 0.037 | 0.9 | 0.021 | 0.0053 | 0.0026 | 0.0026 | | | 0.22 |
| E | 0.09 | 0.5 | 2.0 | 0.007 | 0.0035 | 0.015 | 0.6 | 0.014 | 0.0041 | 0.0015 | 0.0046 | | | |
| F | 0.07 | 0.2 | 1.7 | 0.005 | 0.0026 | 0.031 | 1.4 | 0.007 | 0.0037 | 0.0019 | 0.0027 | | | |
| G | 0.03 | 0.3 | 1.5 | 0.006 | 0.0024 | 0.036 | 0.6 | 0.005 | 0.0018 | 0.0042 | 0.0047 | 1.60 | | |
| H | 0.08 | 0.4 | 1.3 | 0.003 | 0.0009 | 0.016 | 1.7 | 0.026 | 0.0063 | 0.0015 | 0.0007 | | 0.25 | |
| J | 0.08 | 0.3 | 1.8 | 0.007 | 0.0016 | 0.047 | 1.1 | 0.017 | 0.0051 | 0.0019 | 0.0035 | | | |
| K | 0.09 | 0.3 | 1.7 | 0.006 | 0.0012 | 0.023 | 1.3 | 0.015 | 0.0041 | 0.0028 | 0.0029 | | | |
| <u>L</u> | <u>0.14</u> | 0.1 | 1.0 | 0.004 | 0.0016 | 0.028 | 1.8 | 0.017 | 0.0055 | 0.0018 | 0.0013 | | | |
| <u>M</u> | 0.09 | 0.2 | 1.4 | 0.005 | 0.0008 | 0.036 | 1.5 | 0.006 | 0.0048 | 0.0017 | 0.0019 | | 0.15 | |
| <u>N</u> | 0.08 | 0.2 | 1.5 | 0.006 | 0.0015 | 0.036 | 0.7 | 0.014 | 0.0051 | 0.0025 | 0.0048 | 0.30 | 0.26 | |
| <u>O</u> | 0.08 | 0.2 | 1.3 | 0.006 | 0.0024 | 0.018 | 0.8 | 0.025 | 0.0036 | 0.0036 | 0.0041 | 0.71 | | 0.24 |
| <u>P</u> | 0.06 | 0.2 | 1.7 | 0.006 | 0.0006 | 0.024 | 1.2 | 0.007 | 0.0031 | 0.0008 | <u>0.0003</u> | 0.26 | | |
| <u>Q</u> | 0.10 | 0.2 | 1.8 | 0.008 | 0.0021 | 0.038 | 1.1 | 0.013 | 0.0028 | 0.0032 | 0.0024 | | 0.16 | |
| <u>R</u> | 0.09 | 0.4 | 1.6 | 0.005 | 0.0018 | 0.031 | 0.9 | 0.022 | 0.0045 | 0.0026 | 0.0028 | | | 0.23 |
| <u>S</u> | 0.07 | 0.3 | 1.6 | 0.006 | 0.0013 | 0.041 | 1.0 | <u>0.003</u> | 0.0020 | 0.0035 | 0.0032 | 0.45 | | |
| <u>T</u> | 0.09 | 0.3 | 1.6 | 0.003 | 0.0014 | 0.025 | 1.4 | <u>0.009</u> | 0.0043 | 0.0045 | 0.0022 | | | |
| <u>U</u> | 0.08 | 0.3 | 1.5 | 0.005 | 0.0047 | 0.024 | 0.9 | 0.022 | 0.0051 | 0.0042 | <u>0.0075</u> | 0.35 | | 0.09 |

| Steel type | Nb | V | W | B | REM | Mg | Ti/N | Ceq (%) | Pcm (%) | ACR | Examples |
|---|---|---|---|---|---|---|---|---|---|---|---|
| A | | | | | | | 2.3 | 0.50 | 0.19 | 0.4 | Example |
| B | | | | | | | 2.4 | 0.48 | 0.22 | 0.2 | Example |
| C | 0.022 | | | | | | 4.7 | 0.45 | 0.22 | 1.4 | Example |
| D | | | | | | | 4.0 | 0.45 | 0.20 | 0.5 | Example |
| E | | 0.03 | | | | | 3.4 | 0.47 | 0.22 | 0.8 | Example |
| F | | | | | | 0.002 | 1.9 | 0.45 | 0.19 | 0.5 | Example |
| G | | | | | | | 2.8 | 0.43 | 0.21 | 0.5 | Example |
| H | | | | | | | 4.1 | 0.46 | 0.20 | 0.3 | Example |
| J | | | | 0.002 | | | 3.3 | 0.45 | 0.21 | 1.1 | Example |
| K | | | | | 0.008 | | 3.7 | 0.46 | 0.21 | 0.9 | Example |
| <u>L</u> | | | | | | | 3.1 | 0.43 | 0.22 | 0.3 | Comparative example |
| <u>M</u> | 0.007 | | | | | | <u>1.3</u> | 0.45 | 0.20 | 1.2 | Comparative example |
| <u>N</u> | | | | | | | 2.7 | 0.45 | 0.20 | <u>1.5</u> | Comparative example |
| <u>O</u> | | | | | | | <u>6.9</u> | 0.45 | 0.22 | 0.5 | Comparative example |
| <u>P</u> | | | 0.08 | | | | 2.3 | 0.44 | 0.18 | 0.2 | Comparative example |
| <u>Q</u> | | | | | | | 4.6 | <u>0.51</u> | 0.22 | 0.3 | Comparative example |
| <u>R</u> | | 0.04 | | 0.002 | | | 4.9 | 0.47 | <u>0.23</u> | 0.6 | Comparative example |
| <u>S</u> | | | | | | | 1.5 | 0.43 | 0.20 | 0.7 | Comparative example |
| <u>T</u> | | | | | | 0.001 | 2.1 | 0.45 | 0.20 | <u>0.1</u> | Comparative example |
| <u>U</u> | 0.011 | 0.02 | | | | | 4.3 | 0.44 | 0.21 | 0.5 | Comparative example |

Note 1:
Underlined data are outside the scope of the invention.

Note 2:
Ceq = [C] + [Mn]/6 + ([Cu] + [Ni])/15 + ([Cr] + [Mo] + [V])/5, Pcm = [C] + [Si]/30 + ([Mn] + [Cu] + [Cr])/20 + [Ni]/60 + [Mo]/15 + [V]/10 + 5[B] ACR = (Ca − (0.18 + 130 × Ca) × O)/(1.25 × S) The alloying elements in the formulae denote the corresponding contents (mass %).

TABLE 2

| No. | Steel type | Thickness (mm) | Heating temperature (° C.) | Cumulative rolling reduction with rolling reduction/pass being 8% or more at 950° C. or more (%) | Cumulative rolling reduction with rolling reduction/pass being 5% or more at 950° C. or more (%) | Cumulative rolling reduction at less than 950° C. | Average cooling rate between 700° C. and 500° C. (° C./s) | Tempering temperature (° C.) |
|---|---|---|---|---|---|---|---|---|
| 1 | A | 35 | 1100 | 48 | 53 | 53 | 18 | — |
| 2 | B | 76 | 1020 | 36 | 36 | 45 | 7 | — |
| 3 | C | 30 | 1190 | 53 | 53 | 67 | 31 | 610 |

TABLE 2-continued

| No. | Steel | | | | | | | |
|---|---|---|---|---|---|---|---|---|
| 4 | D | 51 | 1050 | 38 | 43 | 55 | 10 | 560 |
| 5 | E | 25 | 970 | 31 | 31 | 67 | 48 | 650 |
| 6 | F | 80 | 1070 | 48 | 60 | 50 | 5 | — |
| 7 | G | 80 | 1100 | 42 | 42 | 42 | 6 | 550 |
| 8 | H | 34 | 1120 | 43 | 49 | 49 | 22 | — |
| 9 | I | 102 | 1090 | 38 | 44 | 51 | 3 | 520 |
| 10 | J | 51 | 1030 | 33 | 33 | 56 | 13 | 580 |
| 11 | K | 63 | 1150 | 46 | 46 | 50 | 9 | — |
| 12 | L | 63 | 1040 | 41 | 41 | 48 | 8 | — |
| 13 | M | 50 | 1090 | 38 | 38 | 45 | 13 | 600 |
| 14 | N | 38 | 1070 | 37 | 37 | 58 | 18 | — |
| 15 | O | 60 | 1160 | 38 | 52 | 53 | 10 | 650 |
| 16 | P | 34 | 1080 | 43 | 43 | 63 | 20 | — |
| 17 | Q | 76 | 1150 | 56 | 56 | 39 | 6 | — |
| 18 | R | 50 | 1050 | 36 | 36 | 58 | 13 | 580 |
| 19 | S | 40 | 1100 | 45 | 50 | 53 | 16 | 550 |
| 20 | T | 34 | 1070 | 40 | 40 | 60 | 19 | — |
| 21 | U | 76 | 1130 | 47 | 52 | 46 | 7 | 560 |
| 23 | J | 76 | 1140 | 40 | 40 | 45 | 6 | _760_ |
| 24 | C | 35 | _920_ | 39 | 39 | 55 | 18 | — |
| 25 | H | 76 | 1030 | 35 | 35 | _35_ | 8 | — |
| 26 | B | 40 | _1230_ | 43 | 49 | 56 | 15 | — |
| 27 | E | 41 | 1070 | _25_ | _25_ | 50 | 14 | 610 |

| No. | Effective grain size (μm) | Density of Ca complex inclusions at ¼t (/mm²) | Density of Ca complex inclusions at ½t (/mm²) | YS of base material at ¼t (MPa) | Number of weld passes | δ in CGHAZ (mm) | δ at SC/ICHAZ boundary (mm) | Examples |
|---|---|---|---|---|---|---|---|---|
| 1 | 13 | 58 | 50 | 551 | 18 | 0.69 | 0.81 | Example |
| 2 | 17 | 73 | 65 | 553 | 45 | 0.55 | 0.66 | Example |
| 3 | 9 | 66 | 61 | 570 | 16 | 0.71 | 1.03 | Example |
| 4 | 11 | 61 | 56 | 563 | 23 | 1.35 | 1.48 | Example |
| 5 | 8 | 89 | 80 | 585 | 15 | 0.84 | 0.79 | Example |
| 6 | 19 | 42 | 48 | 503 | 48 | 1.86 | 1.23 | Example |
| 7 | 17 | 112 | 104 | 526 | 49 | 1.53 | 1.19 | Example |
| 8 | 13 | 31 | 28 | 574 | 17 | 0.58 | 1.13 | Example |
| 9 | 18 | 48 | 40 | 549 | 58 | 1.36 | 1.85 | Example |
| 10 | 12 | 67 | 60 | 542 | 24 | 1.06 | 1.25 | Example |
| 11 | 12 | 49 | 45 | 567 | 36 | 1.45 | 2.01 | Example |
| 12 | 17 | 39 | 35 | 553 | 37 | _0.19_ | 0.81 | Comparative example |
| 13 | 20 | 53 | 46 | 546 | 22 | _0.23_ | 0.94 | Comparative example |
| 14 | 14 | _18_ | _13_ | 524 | 20 | _0.26_ | 1.53 | Comparative example |
| 15 | 13 | 78 | 65 | 598 | 35 | _0.31_ | 0.46 | Comparative example |
| 16 | 16 | _6_ | _2_ | 511 | 18 | _0.11_ | 1.35 | Comparative example |
| 17 | 18 | 69 | 68 | 592 | 45 | _0.21_ | 1.35 | Comparative example |
| 18 | 13 | 56 | 59 | 594 | 23 | _0.18_ | 0.65 | Comparative example |
| 19 | 13 | 69 | 60 | 536 | 20 | _0.09_ | 0.96 | Comparative example |
| 20 | 12 | _13_ | _11_ | 550 | 17 | _0.23_ | 1.28 | Comparative example |
| 21 | 15 | _266_ | _250_ | 578 | 46 | _0.16_ | _0.31_ | Comparative example |
| 23 | 23 | 65 | 61 | 518 | 44 | 0.89 | _0.31_ | Comparative example |
| 24 | _30_ | 52 | 47 | 539 | 19 | 0.54 | _0.29_ | Comparative example |
| 25 | _33_ | 36 | 33 | 509 | 46 | 0.48 | _0.17_ | Comparative example |
| 26 | _28_ | 70 | 72 | 586 | 20 | 0.49 | _0.32_ | Comparative example |
| 27 | _31_ | 70 | 73 | 550 | 21 | 0.65 | _0.22_ | Comparative example |

Note 1:
Underlined data are outside the scope of the invention.

Note 2:
t denotes thickness (mm)

The invention claimed is:

1. A thick steel plate having good multipass weld joint CTOD characteristics, comprising, on a mass percent basis: C: 0.03% to 0.12%, Si: 0.5% or less, Mn: 1.0% to 2.0%, P: 0.015% or less, S: 0.0005% to 0.0050%, Al: 0.005% to 0.060%, Ni 0.5% to 2.0%, Ti: 0.005% to 0.030%, N: 0.0015% to 0.0065%, O: 0.0010% to 0.0050%, and Ca: 0.0005% to 0.0060% so as to satisfy the formulae (1) to (4), the remainder being Fe and incidental impurities, a base material of the plate has an effective grain size of 20 μm or less at half the thickness of the plate, and the plate contains 25 to 250 /mm² of complex inclusions at ¼ and ½ of the thickness of the plate where thickness is in millimeters, the complex inclusions being composed of a sulfide containing Ca and Mn and an oxide containing Al and having an equivalent circular diameter of 0.1 μm or more:

$$1.5 \leq Ti/N \leq 5.0 \quad \text{Formula (1):}$$

$$0.43 \leq Ceq(=[C]+[Mn]/6+([Cu]+[Ni])/15+([Cr]+[Mo]+[V])/5) \leq 0.50 \quad \text{Formula (2):}$$

$$0.18 \leq Pcm(=[C]+[Si]/30+([Mn]+[Cu]+[Cr])/20+[Ni]/60+[Mo]/15+[V]/10+5[B]) \leq 0.22 \quad \text{Formula (3):}$$

$$0.2 \leq (Ca-(0.18+130*Ca)*O)/(1.25*S) < 1.4 \quad \text{Formula (4):}$$

wherein alloying elements in the formulae (1) to (4) denote the corresponding contents (mass %).

2. The thick steel plate having good multipass weld joint CTOD characteristics according to claim 1, further comprising, on a mass percent basis, one or two or more of Cu: 0.05% to 2.0%, Cr: 0.05% to 0.30%, Mo: 0.05% to 0.30%, Nb: 0.005% to 0.035%, V: 0.01% to 0.10%, W: 0.01% to 0.50%, B: 0.0005% to 0.0020%, REM: 0.0020% to 0.0200%, and Mg: 0.0002% to 0.0060%.

3. A method for manufacturing the thick steel plate having good multipass weld joint CTOD characteristics according to claim 1, comprising: heating a slab having the composition according to claim 1 to a temperature in a range of from 950° C. to 1200° C., hot rolling the slab at a cumulative rolling reduction of 30% or more with a rolling reduction/pass being 8% or more at a half-thickness temperature of 950° C. or more and at a cumulative rolling reduction of 40% or more at a half-thickness temperature of less than 950° C., and cooling the hot-rolled plate to 600° C. or less with an average cooling rate between 700° C. and 500° C. at half the thickness of the plate being in the range of 3° C. to 50° C./s.

4. A method for manufacturing the thick steel plate having good multipass weld joint CTOD characteristics according to claim 1, comprising: heating a slab having the composition according to claim 1 to a temperature in a range of from 950° C. to 1200° C., hot rolling the slab at a cumulative rolling reduction of 33% or more with a rolling reduction/pass being 5% or more at a half-thickness temperature of 950° C. or more and at a cumulative rolling reduction of 40% or more at a half-thickness temperature of less than 950° C., and cooling the hot-rolled plate to 600° C. or less with an average cooling rate between 700° C. and 500° C. at half the thickness of the plate being in the range of 3° C. to 50° C./s.

5. The method for manufacturing the thick steel plate having good multipass weld joint CTOD characteristics according to claim 3, further comprising performing tempering treatment at a temperature of 700° C. or less after the cooling.

6. A method for manufacturing the thick steel plate having good multipass weld joint CTOD characteristics according to claim 2, comprising: heating a slab having the composition according to claim 2 to a temperature in a range of from 950° C. to 1200° C., hot rolling the slab at a cumulative rolling reduction of 30% or more with a rolling reduction/pass being 8% or more at a half-thickness temperature of 950° C. or more and at a cumulative rolling reduction of 40% or more at a half-thickness temperature of less than 950° C., and cooling the hot-rolled plate to 600° C. or less with an average cooling rate between 700° C. and 500° C. at half the thickness of the plate being in the range of 3° C. to 50° C./s.

7. A method for manufacturing the thick steel plate having good multipass weld joint CTOD characteristics according to claim 2, comprising: heating a slab having the composition according to claim 2 to a temperature in a range of from 950° C. to 1200° C., hot rolling the slab at a cumulative rolling reduction of 33% or more with a rolling reduction/pass being 5% or more at a half-thickness temperature of 950° C. or more and at a cumulative rolling reduction of 40% or more at a half-thickness temperature of less than 950° C., and cooling the hot-rolled plate to 600° C. or less with an average cooling rate between 700° C. and 500° C. at half the thickness of the plate being in the range of 3° C. to 50° C./s.

8. The method for manufacturing the thick steel plate having good multipass weld joint CTOD characteristics according to claim 4, further comprising performing tempering treatment at a temperature of 700° C. or less after the cooling.

9. The method for manufacturing the thick steel plate having good multipass weld joint CTOD characteristics according to claim 6, further comprising performing tempering treatment at a temperature of 700° C. or less after the cooling.

10. The method for manufacturing the thick steel plate having good multipass weld joint CTOD characteristics according to claim 7, further comprising performing tempering treatment at a temperature of 700° C. or less after the cooling.

* * * * *